(12) United States Patent
Miyoshi et al.

(10) Patent No.: US 12,323,001 B2
(45) Date of Patent: Jun. 3, 2025

(54) STATOR AND MOTOR INCLUDING THE STATOR

(71) Applicant: TBK Co., Ltd., Tokyo (JP)

(72) Inventors: Akihiro Miyoshi, Kawasaki (JP); Mitsuyoshi Oba, Ebina (JP); Keisuke Kurihara, Tokyo (JP)

(73) Assignee: TBK Co., Ltd., Tokyo (JP)

( * ) Notice: Subject to any disclaimer, the term of this patent is extended or adjusted under 35 U.S.C. 154(b) by 161 days.

(21) Appl. No.: 18/251,894

(22) PCT Filed: Nov. 6, 2020

(86) PCT No.: PCT/JP2020/041480
§ 371 (c)(1),
(2) Date: May 5, 2023

(87) PCT Pub. No.: WO2022/097261
PCT Pub. Date: May 12, 2022

(65) Prior Publication Data
US 2023/0421001 A1    Dec. 28, 2023

(51) Int. Cl.
*H02K 1/14* (2006.01)
*H02K 1/18* (2006.01)
*H02K 21/22* (2006.01)

(52) U.S. Cl.
CPC ............. *H02K 1/148* (2013.01); *H02K 1/187* (2013.01); *H02K 21/227* (2013.01)

(58) Field of Classification Search
CPC ....... H02K 1/148; H02K 1/187; H02K 21/227
USPC ............. 310/179, 216.008, 216.009
See application file for complete search history.

(56) References Cited

U.S. PATENT DOCUMENTS

2016/0137071 A1    5/2016   Kato et al.

FOREIGN PATENT DOCUMENTS

| | | |
|---|---|---|
| CN | 107370255 A | 11/2017 |
| CN | 107394910 A * | 11/2017 |
| CN | 108667167 A | 10/2018 |
| JP | 2003-032952 A | 1/2003 |
| JP | 2008-199856 A | 8/2008 |
| JP | 2019-092355 A | 6/2019 |
| WO | 2015/159385 A1 | 10/2015 |
| WO | 2020/067250 A1 | 4/2020 |

OTHER PUBLICATIONS

The extended European search report issued by the European Patent Office on Jul. 5, 2024, which corresponds to European Patent Application No. 20960814.0-1002 and is related to U.S. Appl. No. 18/251,894.

(Continued)

*Primary Examiner* — Jose A Gonzalez Quinones
(74) *Attorney, Agent, or Firm* — Studebaker Brackett PLLC (57) ABSTRACT

A stator (10) according to the present invention comprises: a yoke part (11) composed of a plurality of block bodies having an arc shape with a rectangular cross section; fixing members (12, 13) for disposing and fixing the plurality of block bodies in an annular shape; a plurality of teeth parts (14) erected on the peripheral surface of the yoke part; and a coil (15) wound around the plurality of teeth parts (14).

6 Claims, 7 Drawing Sheets

(56) References Cited

OTHER PUBLICATIONS

An Office Action; "Notice of Reasons for Refusal," mailed by the Japanese Patent Office on Jul. 9, 2024, which corresponds to Japanese Patent Application No. 2022-560591 and is related to U.S. Appl. No. 18/251,894; with English language translation.
An Office Action mailed by the Korean Intellectual Property Office on Sep. 11, 2024, which corresponds to Korean Patent Application No. 10-2023-7016734 and is related to U.S. Appl. No. 18/251,894; with English translation.
International Preliminary Report On Patentability and Written Opinion issued in PCT/JP2020/041480; mailed May 19, 2023.
International Search Report issued in PCT/JP2020/041480; mailed Dec. 8, 2020.

\* cited by examiner

STATOR AND MOTOR INCLUDING THE STATOR

TECHNICAL FIELD

The present invention relates to a stator for a motor and to a motor including the stator.

TECHNICAL BACKGROUND

Conventionally, like a motor system for an automobile disclosed in patent Document 1, some motor systems have an outer rotor type motor added to between an engine and a driving wheel, and this motor assists engine torque at the start of an automobile. In addition, in some conventional stators for motors, for example as disclosed in Patent Document 2, a plurality of recesses for engaging with tooth portions are formed in an outer circumferential face of an annular yoke portion, a mating portion for mating with the shape of the recess formed in the yoke portion is formed at a tip of each tooth portion, and the plurality of tooth portions are erected on the yoke portion by mating the mating portions of the tooth portions with the recesses of the yoke portion. Furthermore, in a case where the yoke portion and the tooth portions are configured as separate parts, when the stator is assembled, unlike the stator disclosed in Patent Document 2, coils are not wound around the plurality of tooth portions after the tooth portions are erected on the yoke portion, but coils are wound around the plurality of tooth portions before the yoke portion is mated with the tooth portions, and in that state the tooth portions are erected onto the yoke portion, which can facilitate the task of winding the coils around the tooth portion.

PRIOR ARTS LIST

Patent Document

Patent Document 1: International Patent Publication No. WO 2015/159385 A1

Patent Document 2: Japanese Laid-Open Patent Publication No. 2019-92355(A)

SUMMARY OF THE INVENTION

Problems to be Solved by the Invention

However, since the shape of the yoke portion of the stator in Patent Document 2 is annular, and when an electromagnetic steel material is processed to fabricate the yoke portion, a region in the electromagnetic steel material inside an inner circumferential edge of the annular yoke portion is discarded, such a stator has a problem where its manufacturing yield lowers.

The present invention has been made in view of such a problem, and an object thereof is to provide a stator that achieves improvement in manufacturing yield, and a motor including this stator.

Means to Solve the Problems

In order to solve the above problem, a stator according to the present invention comprises a yoke portion comprising a plurality of circular arc-shaped block bodies rectangular in cross section (for example, divisional yokes 110, 110a' 110b', 110c' in an embodiment), a fixing member (for example, a bracket 12 and a ring plate 13 in the embodiment) fixing the plurality of block bodies arranged annularly, a plurality of tooth portions (for example, teeth 14 in the embodiment) erected on a circumferential face of the yoke portion, and a coil (for example, a coil 15 in the embodiment) wound around the plurality of tooth portions.

In addition, in the stator according to the present invention, it is preferred that the fixing member comprises an annular first fixing member (for example, the ring plate 13 in the embodiment) placed facing one of two opposite planar faces of the yoke portion, and an annular second fixing member (for example, the bracket 12 in the embodiment) placed facing the other planar face of the yoke portion, and that the first fixing member and the second fixing member have respective radial widths (for example, widths Wr, Wb in the embodiment) enough to cover engaging portions of the yoke portion and the tooth portion when the plurality of block bodies are fixed in an annularly arranged state.

In addition, in the stator according to the present invention, it is preferred that when the plurality of block bodies are annularly arranged with the tooth portions erected on each of the plurality of block bodies, and are fixed by the fixing member, the plurality of tooth portions abut against one another fully circumferentially, and a gap (for example, a gap GP in the embodiment) be created between the plurality of block bodies.

In addition, in the stator according to the present invention, it is preferred that the engaging portions engaging with each other (for example, an engaging recess 116 and an engaging projection 140 in the embodiment) be formed in the circumferential face of the yoke portion and at a tip of the tooth portion, that the plurality of block bodies be screwed to the second fixing member with a screw via the first fixing member, and that a screw hole for the screwing (for example, yoke fixing screw holes 112, 122, 132 in the embodiment) be provided in a position corresponding to the engaging portions.

Furthermore, a motor may comprises a stator according to the present invention, and a rotor (for example, a rotor 20 in the embodiment) rotated by a rotating magnetic field generated by the stator.

Advantageous Effects of the Invention

Since the yoke portion constituting the stator is composed of a plurality of circular arc-shaped block bodies rectangular in cross section, the stator according to the present invention can obtain a large number of members from an electromagnetic steel sheet which is a material for the yoke portion, as compared to a conventional stator, so that the manufacturing yield can be improved.

DESCRIPTION OF THE EMBODIMENTS

Figure 1:
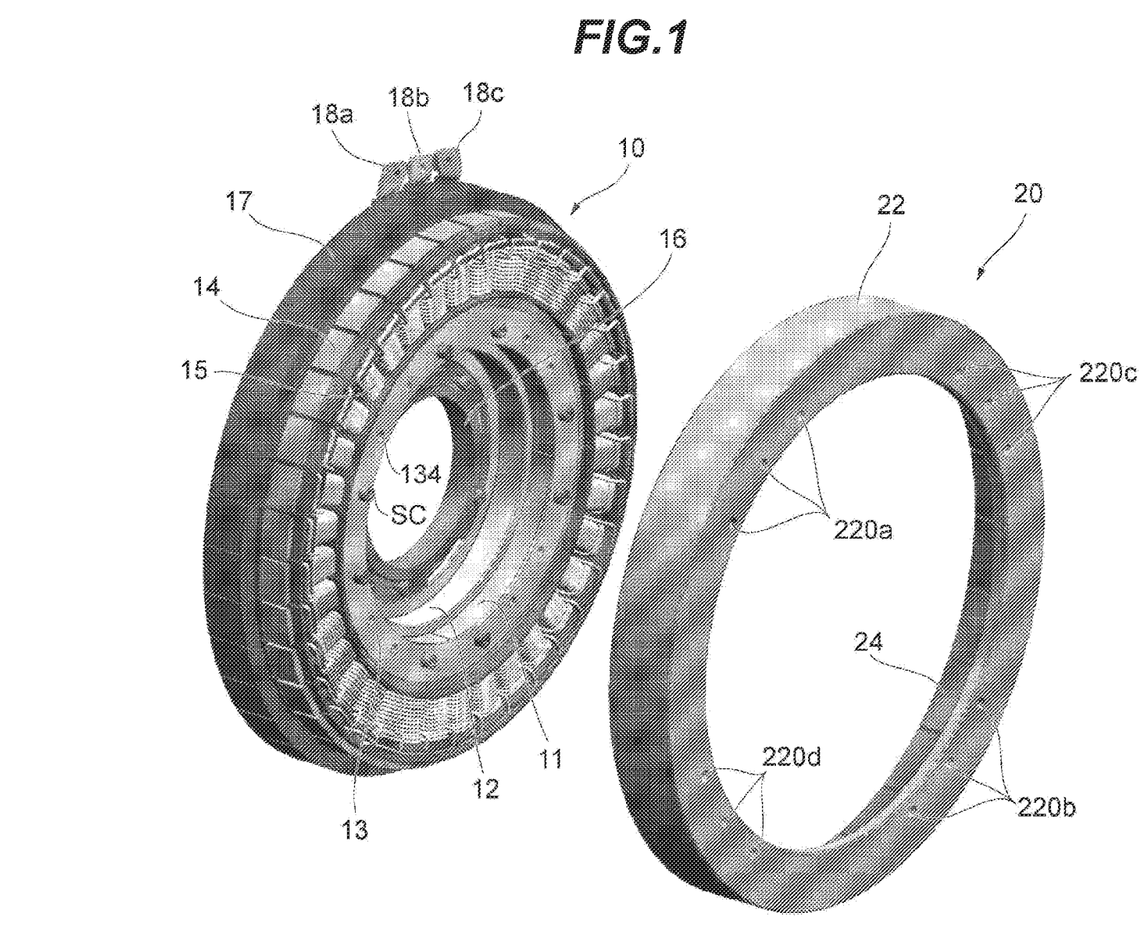
FIG. 1 is an exploded perspective view of a motor including a stator according to the present embodiment.

A preferred embodiment of the present invention will be described below with reference to the drawings. First, a general configuration of a motor including a stator according to the present embodiment will be described with reference to FIG. 1. A motor 1 shown in FIG. 1 is an outer rotor type three-phase synchronous motor used to assist torque, for example at the start of a vehicle engine or the like. The motor 1 is mainly composed of a stator 10 and a rotor 20. The stator 10 generates a rotating magnetic field to rotate the rotor 20, and the rotor 20 is rotated by the rotating magnetic field generated by the stator 10, and transmits its rotating force to the vehicle engine.

The rotor 20 is composed of a rotor frame 22 which is an annular body substantially L-shaped in cross section, and a plurality of permanent magnets 24 fixed along an inner circumferential face of the rotor frame 22. Three screw holes 220a spaced at predetermined angular intervals are provided in a planar portion of the rotor frame 22, and three screw holes 220b are provided in positions of point symmetry to the screw holes 220a about the center (axis of rotation) of the rotor 20. In addition, three screw holes 220c and 220d are provided in positions shifted circumferentially by 90 degrees from the positions of the screw holes 220a and 220b. By means of these screw holes, the rotor 20 is screwed to a flywheel (not shown) of the vehicle engine.

The stator 10 includes a yoke 11, a bracket 12, a ring plate 13, a plurality of teeth 14, a coil 15, a resolver stator 16, and an insulator 17. The yoke 11 is a member made of metal which is a substantially annular body rectangular in cross section, and the plurality of teeth 14, which will be described later, are erected on a side face (a circumferential face) of the yoke 11. The bracket 12 is an annular member made of metal for fixing the yoke 11 between the bracket 12 and the ring plate 13. A step serving as a positioning portion for the yoke 11 when the stator 10 is assembled is formed in an inner circumferential edge of the bracket 12. In addition, the bracket 12 can be screwed to the vehicle engine (more specifically, a flywheel housing), thereby enabling the stator 10 to be fixed to the vehicle engine, and also to release heat generated at the yoke 11 and/or the coil 15 to the vehicle side.

The ring plate 13 is a member made of metal which is a flat plate and also a continuous annular body, and, as described above, fixes the yoke 11 to the bracket 12. The tooth 14 is a member made of metal around which a conducting wire is wound to form the coil 15, and a plurality of (thirty-six in the present embodiment) teeth 14 are erected on the circumferential face of the yoke 11. The coils 15 are divided into three phases and connected to one another, and driving power is supplied to the coils 15 of the respective phases via busbars 18a, 18b, and 18c. The resolver stator 16 is an annular member fixed to an inner circumferential side of the bracket 12, and outputs voltage corresponding to the angle of rotation of a crankshaft (not shown) to which the rotor 20 is fixed, to a drive control part (not shown) of the motor.

The insulator 17 is a member made of resin so provided as to correspond to each tooth 14, and covers a portion of the corresponding tooth 14 around which the conducting wire is wound, thereby protecting the surface of the conducting wire. That is, since if the conducting wire is wound directly around the tooth 14, an insulation coating the surface of the conducting wire may be damaged by an edge of the tooth 14, the insulator 17 is provided in order to avoid such damage.

Figures 2A, 2B:
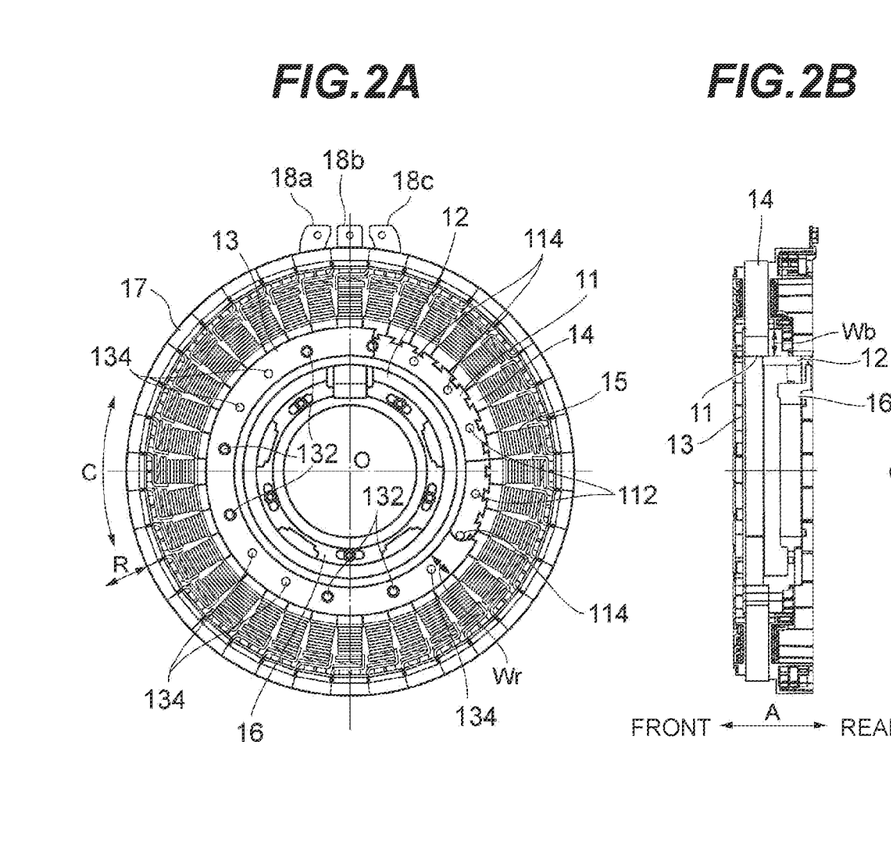
FIGS. 2A, 2B, and 2C are external views of the stator.
Figure 2C:
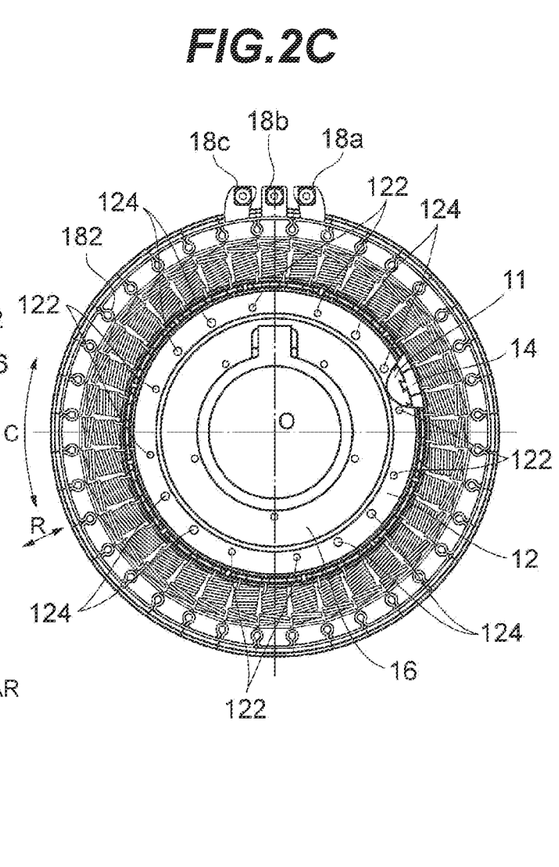

Next, the configuration of the stator 10 will be described with reference to FIGS. 2A, 2B, and 2C. FIGS. 2A, 2B, and 2C are diagrams showing the appearance of the stator 10, FIG. 2A is a front view of the stator 10 as viewed from the rotor 10 shown in FIG. 1, FIG. 2B is a side view of the stator 10 as viewed from the right of the sheet of the drawing of FIG. 2A, and FIG. 2C is a rear view of the stator 10. In FIGS. 2A and 2C, a direction along an outer circumference of the stator 10 (see an arrow C) is referred to as a circumferential direction, and a direction extending radially from a center point O of the stator 10 (see an arrow R), is referred to as a radial direction, and a direction horizontal on the sheet of the drawing of FIG. 2B (see an arrow A) is referred to as an axial direction.

In addition, regarding the axial direction indicated in FIG. 2B, the left direction is referred to as "front", and the right direction is referred to as "rear". Accordingly, it may be said that FIG. 2A shows a front face of the stator 10, and FIG. 2C shows a rear face of the stator 10. Furthermore, FIG. 2A shows the ring plate 13 in a partially cutaway manner, and FIG. 2C shows the bracket 12 in a partially cutaway manner. It should be noted that, in FIGS. 2A, 2B, and 2C, components identical to those in FIG. 1 are denoted by the same reference numerals and characters as in FIG. 1 for the purpose of omitting detailed descriptions thereof.

As shown in FIG. 2A, the thirty-six teeth 14 are erected on the outer circumferential face of the yoke 11 at equal angular intervals, and the conducting wire is wound around each tooth 14 to form the coil 15. These coils 15 are connected to one another by a bus ring 182 for each phase, and connected to the busbar of the corresponding phase. It should be noted that in FIG. 2C, only the bus ring corresponding to one of the phases is denoted by the reference numeral 182, and the reference numerals denoting the bus rings corresponding respectively to the other two phases are omitted.

Engaging portions having mutually complementary shapes are formed in the yoke 11 and on each tooth 14, and the tooth 14 is erected on the yoke 11 by engaging their respective engaging portions together. As shown in the cutaway part of the ring plate 13 in FIG. 2A, the engaging portion of the yoke 11 is equivalent to a dovetail mortise (an engaging recess 116 which will be described later) formed in the outer circumferential face of the yoke 11, and the engaging portion of the tooth 14 is equivalent to a tenon (an engaging projection 140 which will be described later) formed at a tip of the tooth 14 and engaging with the above-mentioned dovetail mortise.

As shown in FIG. 2A, the ring plate 12 has a width Wr covering not only the yoke 11 but also the engaging portions of the yoke 11 and the tooth 14 when the yoke 11 is screwed to the bracket 12. In addition, as shown in FIG. 2B, in the bracket 12, a portion abutting against the yoke 11 has a radial width Wb covering the engaging portions of the yoke 11 and the tooth 14 when the yoke 11 is screwed by means of the ring plate 13. In this manner, the ring plate 13 and the bracket 12 hold down the engaging portions of the yoke 11 and the tooth 14, thereby preventing the tooth 14 from being axially displaced relative to the yoke 11.

The yoke 11, as shown in FIG. 2B, is arranged between the ring plate 13 and the bracket 12, and screwed to the bracket 12 with a screw SC shown in FIG. 1. Eight screw holes for fixing the yoke 11 to the bracket 12 are provided as yoke fixing screw holes in each of the ring plate 13, the yoke 11, and the bracket 12. Here, the yoke fixing screws holes of the ring plate 13 are denoted by the reference numeral 132 (see FIG. 2A), the yoke fixing screw holes of the yoke 11 are denoted by the reference numeral 112 (see the cutaway part of the ring plate 13 in FIG. 2A), and the yoke fixing screw holes of the bracket 12 are denoted by the reference numeral 122 (see FIG. 2C). It should be noted that the yoke fixing screw holes of the bracket 12 are internally threaded for threaded engagement with the screws SC, and the yoke fixing screw holes of the ring plate 13 and the yoke 11 are through-holes having no internal threads.

In addition, as described above, the stator 10 shown in FIG. 2 is screwed to the flywheel housing (not shown) of the vehicle engine, and, as holes for this screwing, eight stator fixing screw holes are provided in each of the ring plate 13, the yoke 11, and the bracket 12. Here, the stator fixing screw holes of the ring plate 13 are denoted by the reference numeral 134 (see FIG. 2A), the stator fixing screw holes of the yoke 11 are denoted by the reference numeral 114 (see FIG. 3A), and the stator fixing screw holes of the bracket 12 are denoted by the reference numeral 124 (see FIG. 2C). It should be noted that the stator fixing screw holes of the ring plate 13, the yoke 11, and the bracket 12 are all through-holes having no internal threads.

Figure 3A:
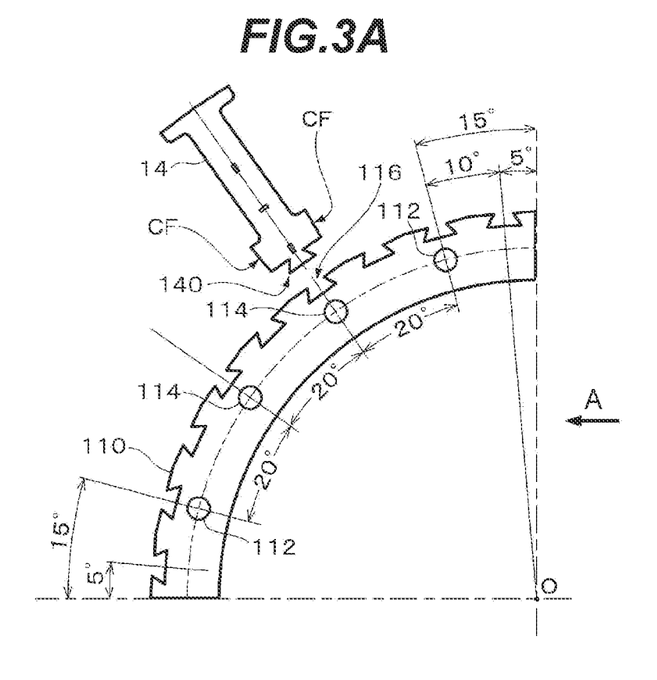
FIGS. 3A and 3B are external views of a divisional yoke constituting the stator.
Figure 3B:
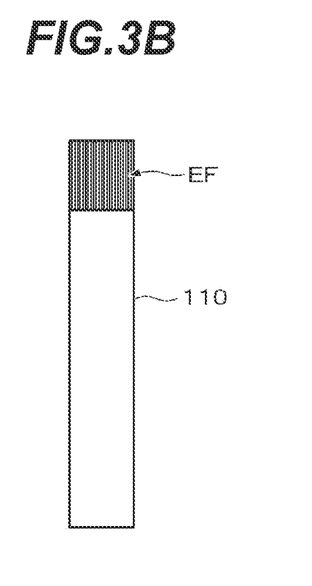

The yoke 11 of the present embodiment is composed of four divisional yokes arranged circularly as viewed from the front. Here, the shape of a divisional yoke 110 constituting the yoke 11 will be described with reference to FIGS. 3A and 3B. In FIGS. 3A and 3B, FIG. 3A shows a front view of the divisional yoke 110, and FIG. 3B shows a side view of the divisional yoke 110 as viewed from the arrow "P." in FIG. 3A. As shown in FIG. 3A, one divisional yoke is a block body having the shape of a circular arc having an angle of degrees, which is formed by laminating numerous (for example, about one hundred) electromagnetic steel sheets (yoke members) having the same shape (see an end face EF in FIG. 3B).

Here, in the case of forming a yoke having an annular shape, like a conventional yoke, the number of yoke members obtained from one electromagnetic steel sheet is small since a part inside the inner circumference of the yoke is discarded. Therefore, when the fact is taken into consideration that a yoke is formed by laminating numerous electromagnetic steel sheets, it is easy to imagine that the yield of manufacturing one yoke is poor. On the other hand, since the yoke 11 of the present embodiment is composed of a plurality of divisional block bodies (namely divisional yokes 110), it can increase the number of yoke members obtained from one electromagnetic steel sheet, and can significantly improve the yield as compared to a conventional yoke.

As shown in FIG. 3A, nine dovetail groove-shaped engaging recesses 116 are formed in the outer circumferential face of the divisional yoke 110. Of them, two engaging recesses 116 closest to both end faces of the divisional yoke 110 are each formed in a position at 5 degrees from each end face in the circumferential direction, and, between these two engaging recesses 116, seven engaging recesses 116 are formed at angular intervals of 10 degrees. It should be noted that, as described above, the engaging projection 140 engaging with the engaging recess 116 is formed at the tip of the teeth 14. In addition, the shape and dimensions of the tooth 14 are determined such that when the engaging recesses 116 adjacent to each other are each engaged with the engaging projection 140 of the tooth 14, opposite abutting faces CF of the adjacent teeth 14 abut against each other.

Figure 4:
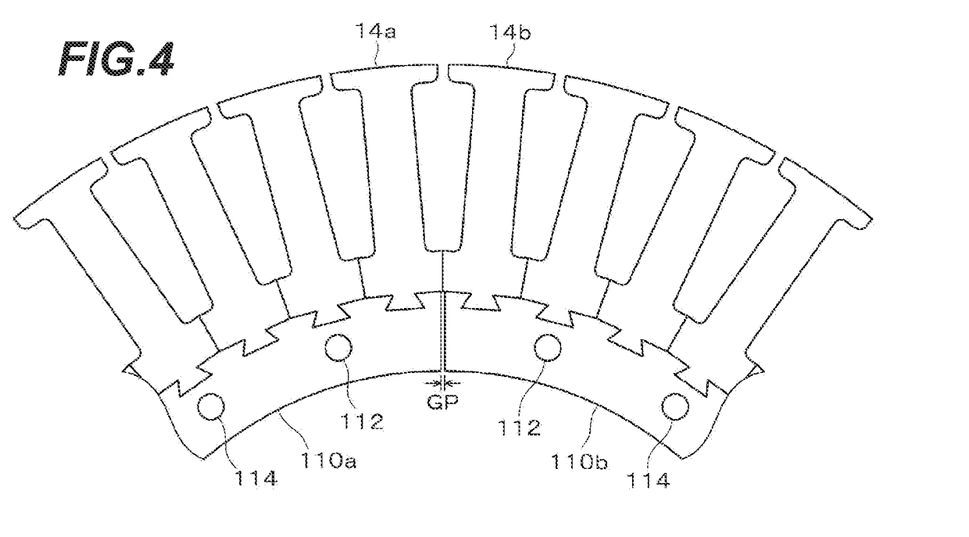
FIG. 4 is a schematic diagram showing a combined state of the divisional yokes of the stator.

In addition, the dimensions of the divisional yoke 110 are determined such that when the four divisional yokes 110 are annularly arranged with the teeth 14 engaged with the divisional yokes 110, a gap GP is created between the end face EF of the divisional yoke 110a and the end face EF of the divisional yoke 110b when the abutting faces CF (not shown) of adjacent teeth 14a, 14b abut against each other, for example as shown in FIG. 4. From another perspective, the dimensions are such that when the engaging projection 140 of the tooth 14 is engaged with the engaging recess 116 closest to the end face EF of the divisional yoke 110, the end face EF of the divisional yoke 110 is located circumferentially back from the abutting face CF.

The assumption will be made here that in a case where the shape and dimensions are determined such that the end face EF of the divisional yoke 110 and the abutting face CF of the tooth 14 are flush with each other, a manufacturing error or the like, for example, causes the end face EF of the divisional yoke 110 to project in the circumferential direction beyond the abutting face CF of the tooth 14. If in this state the divisional yokes 110 having the teeth 14 engaged therewith are circularly arranged, the end faces EF of the divisional yokes 110 opposite to each other abut against each other, but a gap can be created between the abutting faces CF of the teeth 14 opposite to each other. Such a state is not preferable in view of motor performance since it causes an increase in magnetic resistance as compared to the case where the abutting faces CF of the teeth 14 abut against each other and a gap is created between the end faces EF of the divisional yokes 110. Therefore, by forming the gap GP between the end faces EF of the divisional yokes 110 when the divisional yokes 110 having the teeth 14 attached thereto are circularly arranged, it is ensured that the abutting faces CF of the adjacent teeth 14 abut against each other.

Regarding the yoke 11 thus composed of the plurality of divisional yokes 110, a case where the divisional yokes 110 are screwed to the bracket 12 with the screws SC, for example without the ring plate 13 described above, and a case where the divisional yokes 110 are screwed to the bracket 12 via a plurality of circular arc-shaped flat plates instead of the ring plate 13 will be discussed. In the present embodiment, the teeth 14 are attracted to the outer circumferential side by attractive force of the permanent magnets 24 of the rotor frame 22, and, if the ring plate 13 is lacked or if the noncontinuous plates are used, as mentioned above, the divisional yokes 110 and the teeth 14 are inclined relative to the axis of rotation of the rotor frame 22, along with the screws SC, using a threaded engagement part between the screw SC and the bracket 12 as a pivot. This inclination causes a gap between the opposite faces of the tooth 14 and the permanent magnet 24 to be non-uniform in a direction along the axis of rotation of the rotor frame 22. On the other hand, in the present embodiment, since the ring plate 13 is continuously annular, when the teeth 14 are attracted to the permanent magnets 24 of the rotor frame 22, the inclination of the screws SC is suppressed. This can effectively suppress inclination of a tip (an end on the permanent magnets 24 side) of the tooth 14 toward the bracket 12 in the direction along the axis of rotation of the rotor frame 22 according to the inclination of the screw SC, so that the gap between the opposite faces of the tooth 14 and the permanent magnet 24 can be made more uniform.

Figure 5:
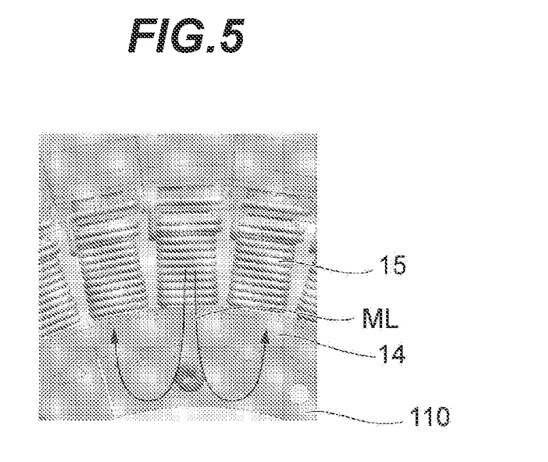
FIG. 5 is an illustrative diagram for illustrating lines of magnetic force generated in the stator.

Referring to FIG. 3A again, the yoke fixing screw holes 112 are provided respectively in positions at an angle of 15 degrees in the circumferential direction from both the end faces of the divisional yoke 110. Furthermore, between the two yoke fixing screw holes 112, the two stator fixing screw holes 114 are provided at angular intervals of 20 degrees in the circumferential direction such that these screw holes are spaced at equal intervals. This determines the positions of the yoke fixing screw holes 112 and the stator fixing screw holes 114 such that they each correspond to a forming position of the engaging recess 116. This is to reduce magnetic resistance due to the screw holes by providing the screw holes such that they each correspond to the forming position of the engaging recess 116, because when the motor of the present embodiment is driven, such lines of magnetic force ML as indicated by arrows in FIG. 5 are generated, and no magnetic path goes immediately below the tooth 14.

Next, relations between the number of divisions of the yoke 11 and the respective numbers of yoke and stator fixing screws will be described with reference to Table 1. The assumption will be made here that the number of screws required to fix a divisional yoke to a bracket is two for each divisional yoke, and that the number of screws required to attach one stator to a vehicle engine is eight. In addition, in Table 1, when the number of divisions of a yoke is zero, it means a conventional annular rotor, and respective yields (reduced area ratios) when the numbers of divisions are two, four, and eight are based on the yield when the number of divisions is zero.

TABLE 1

| Number of Divisions | 0 | 2 | 4 | 8 |
|---|---|---|---|---|
| Yoke Fixing Screws | 2 | 4 | 8 | 16 |
| Stator Fixing Screws | 8 | 8 | 8 | 8 |
| Yield (Reduced Area Ratio) | — | −0.4 | −0.63 | −0.65 |

As shown in Table 1, when the number of divisions is two, the yield is poorly improved as compared to when the number of divisions is four or eight. In addition, when the number of divisions is eight, the improvement in yield is not very different from when the number of divisions is four, but nevertheless the number of yoke fixing screws required is doubled. This is the reason why the number of divisions of the yoke 11 is four in the present embodiment.

Figure 6:
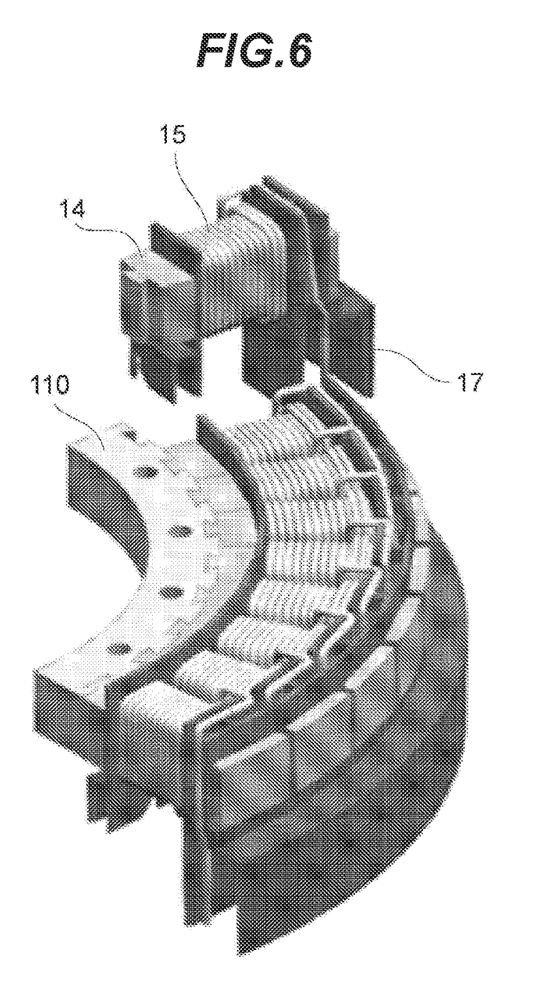
FIG. 6 is an illustrative diagram for illustrating how to assemble the stator.

Next, a part of the task of assembling the stator 10 in the present embodiment will be described with reference to FIGS. 6 and 7. In assembling the stator 10 in the present embodiment, as shown in FIG. 6, first, the insulator 17 is attached to each tooth 14, and a conducting wire is wound around the insulator 17 to form the coil 15. Then, the engaging projections 140 of the teeth 14 having the coils 15 formed therearound are engaged with the engaging recesses 116 of one divisional yoke 110 in order from the near side in FIG. 6. The reason why the teeth 14 are assembled to the divisional yoke 110 in such order lies in the shapes of engaging portions of the insulators 17 adjacent to each other.

Figure 7:
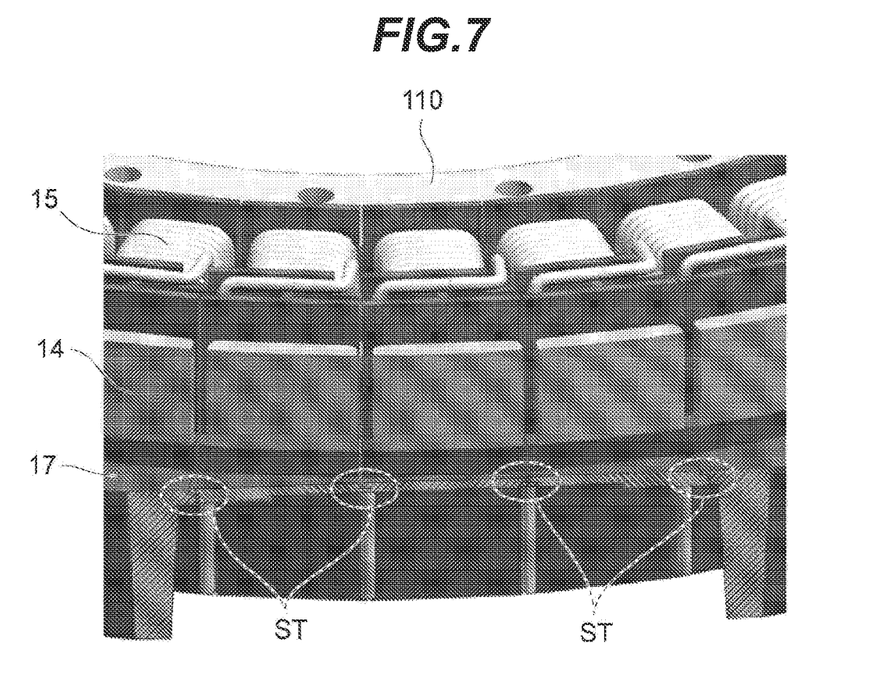
FIG. 7 is an illustrative diagram for illustrating an assembled state of the stator.

In the present embodiment, as shown in FIG. 7, the shape of a portion (an engaging portion ST) of the insulator 17 engaging with the adjacent insulator 17 has a crank-like step formed thereon. In order that the shape of this step fits with the shape of the step of the adjacent insulator 17, in a state shown in FIG. 7, the teeth 14 have to be assembled to the divisional yoke 110 in order from the left in FIG. 7.

Then, with nine teeth 14 having the coils 15 formed therearound assembled to each divisional yoke 110, first, two semi-circumferential yoke sets are assembled by combining two divisional yokes 110 together for each set. Next, the two semi-circumferential yoke sets (also referred to below as "semi-circumferential yokes") are each assembled to the bracket 12. Specifically, the two semi-circumferential yoke sets are each pushed in from the outer circumferential side of the bracket 12 toward the center thereof until an inner circumferential face of each semi-circumferential yoke abuts against the step of the bracket 12, and thereby the two semi-circumferential yoke sets can be annularly arranged. At this time, the abutting faces CF of the teeth 14 located at both ends of one of the semi-circumferential yokes abut reliably against the abutting faces CF of the teeth 14 at both ends of the other semi-circumferential yoke. In addition, the respective positions of the yoke fixing screw holes 112 provided in each of the semi-circumferential yokes annularly arranged coincide in the radial direction with the respective positions of the yoke fixing screw holes 122 provided in the bracket 12.

That is, the step BP of the bracket 12 is formed in such a position that when the inner circumferential face of each semi-circumferential yoke abuts against the step BP of the bracket 12, the abutting faces CF of the teeth 14 located at both the ends of one of the semi-circumferential yokes abut reliably against the abutting faces CF of the teeth 14 located at both the ends of the other semi-circumferential yoke. In addition, the step BP of the bracket 12 is formed in such a position that when the inner circumferential face of each semi-circumferential yoke abuts against the step BP of the bracket 12, the positions of the yoke fixing screw holes 112 provided in each semi-circumferential yoke and the positions of the yoke fixing screw holes 122 provided in the bracket 12 are not misaligned in the radial direction.

Here, in the case of an annular yoke such as a conventional yoke, it is impossible to assemble the teeth 14 one by one to the yoke. That is, even if the teeth 14 are assembled to the yoke one by one in order, the shape of the engaging portion ST of the insulator 17 prevents the last one tooth 14 from being assembled thereto. Therefore, thirty-six teeth 14 having the coils 15 formed therearound have to be first circularly arranged fully circumferentially, and the annular yoke has to be finally assembled to the teeth 14 arranged circularly. In this case, since the thirty-six engaging recesses formed in the yoke have to be engaged one by one with the engaging projection formed on each tooth 14 while the engaging recesses are being aligned with the engaging projections, the assembling task requires much time.

On the other hand, the yoke 11 of the present embodiment can significantly shorten the time for the assembling task since the full circumferential yoke 11 can be assembled by combining the divisional yokes 110 having the teeth 14 assembled thereto.

In addition, since an annular yoke such as a conventional yoke is heavy in weight, in a case where the laminated electromagnetic steel sheets are fixed together by V-shaped interlocking, when the yoke is assembled to the bracket, its own weight may cause distortion, or delamination of the electromagnetic steel sheets, but, in the case where the yoke 11 is composed of the divisional yokes 110, like the present embodiment, such distortion or delamination becomes unlikely since each divisional yoke 110 is lighter in weight.

Figure 8A:
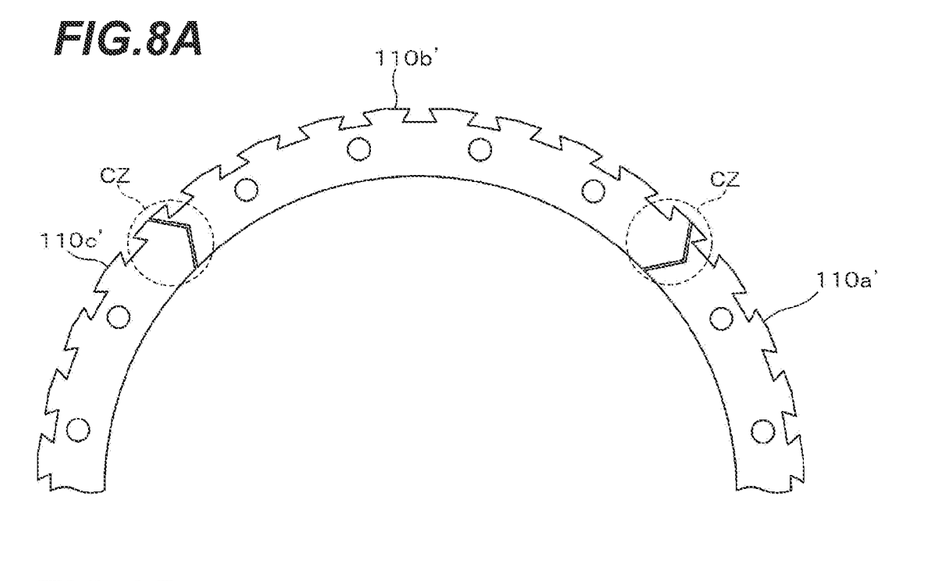
FIGS. 8A and 8B are illustrative diagrams for illustrating the shape of an end of the divisional yoke of the stator.
Figure 8B:
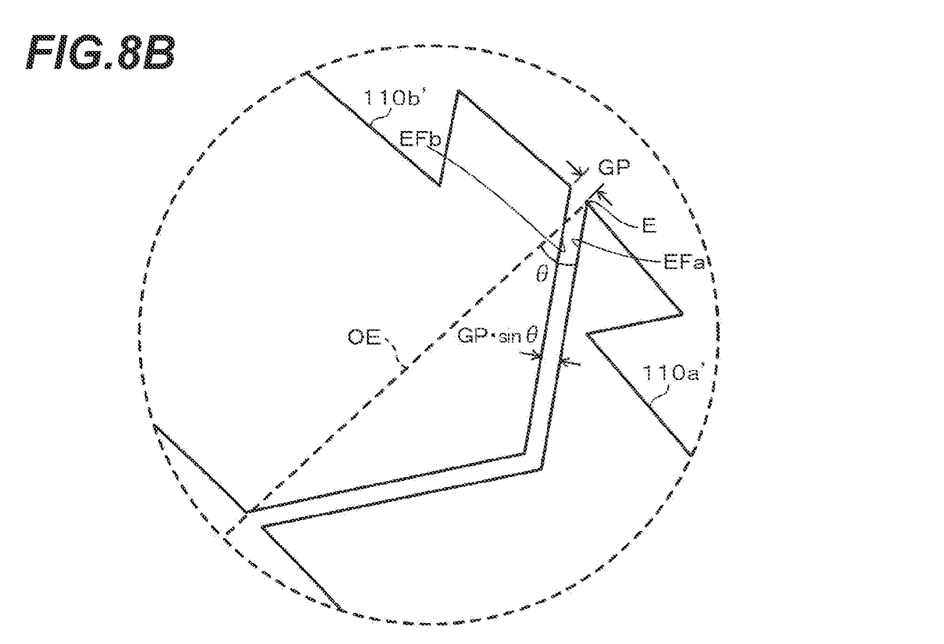

It should be noted that though the end face EF of the divisional yoke 110 shown in FIG. 3B is a face parallel to the radial direction of the stator 10, as shown in FIG. 3A, the end face EF may be a face having a V-shape as viewed from the front, for example as shown in FIG. 8A. If the end face has such a shape, in regions CZ where adjacent divisional yokes 110a' and 110b', and 110b' and 110c' are opposite to each other, their respective opposite faces are angled to the radial direction, so that air gaps therebetween can be reduced, which can improve motor efficiency. For example as shown in FIG. 8B, an end face EFa of the divisional yoke 110a' and an end face EFb of the divisional yoke 110b' are parallel to each other, and an angle between the end face EFa of the divisional yoke 110a' and a line OE connecting the center point O of the stator 10 and an end E of the divisional yoke 110a' is represented by θ. In addition, at the end E, a gap between the divisional yokes 110a' and 110b' on a line perpendicular to the line OE is represented by GP. Then, the air gap between the divisional yokes 110a' and 110b' becomes GP sin θ, and can thereby be made shorter than the gap GP.

It should be noted that though the divisional yokes 110 are screwed to the bracket 12 with the screws SC via the ring plate 13 in the above embodiment, the divisional yokes 110 may be screwed to the bracket 12 without the ring plate 12. In addition, instead of the continuous annular ring plate 13, a plurality of circular arc-shaped flat plates, for example, may be annularly arranged, and the divisional yokes 110 may be screwed to the bracket 12 via these flat plates. In addition, though the case where the stator according to the present invention is applied to the outer rotor type motor has been illustrated and described, the stator according to the present invention is not limited to this configuration. For example, the stator according to the present invention may be applied to an inner rotor type motor having a rotor inside a stator, with a plurality of teeth erected on inner circumferential sides of divisional yokes. In addition, the stator according to the present invention is not limited to a motor, but may also be applied to an electromagnetic retarder used as an auxiliary brake of a large automobile, for example.

EXPLANATION OF NUMERALS AND CHARACTERS

10 Stator
11 Yoke
12 Bracket
13 Ring Plate
14 Tooth
15 Coil
16 Resolver Stator
17 Insulator
18a, 18b, 18c Busbar
20 Rotor
22 Rotor Frame
24 Permanent Magnet
110, 110a', 110b', 110c' Divisional Yoke
112, 122, 132 Yoke Fixing Screw Hole
114, 124, 134 Stator Fixing Screw Hole
116 Engaging Recess
140 Engaging Projection
182 Bus Ring
220 Rotor Fixing Screw Hole

The invention claimed is:

1. A stator comprising:
a yoke portion comprising a plurality of divisional yokes, the divisional yokes being circular arc-shaped block bodies rectangular in cross section;
a fixing member fixing the plurality of block bodies arranged annularly;
a plurality of tooth portions erected on a circumferential face of the yoke portion; and
a coil wound around the plurality of tooth portions,
wherein a shape and a dimension of each tooth portion are configured such that when engaging portions of the divisional yoke adjacent to each other are each engaged with an engaging portion of the tooth portion, opposite abutting faces of the adjacent tooth portions abut against each other, and
a dimension of the divisional yokes is configured such that when the abutting faces of adjacent tooth portions abut against each other, a gap exists between an end face of a divisional yoke and an end face of an adjacent divisional yoke.

2. The stator according to claim 1, wherein the fixing member comprises:
an annular first fixing member placed facing one of two opposite planar faces of the yoke portion, and
an annular second fixing member placed facing the other planar face of the yoke portion, the first fixing member and the second fixing member have respective radial widths enough to cover the engaging portions of the divisional yoke and the engaging portion of the tooth portion when the plurality of divisional yokes are fixed in an annularly arranged state.

3. The stator according to claim 1, wherein when the plurality of divisional yokes are annularly arranged with the tooth portions erected on each of the plurality of divisional yokes, and are fixed by the fixing member, the plurality of tooth portions abut against one another fully circumferentially.

4. The stator according to claim 1, wherein the engaging portions of the divisional yoke are formed in the circumferential face of the divisional yoke and the engaging portion of the tooth portion is formed at a tip of the tooth portion,
the plurality of divisional yokes is screwed to the second fixing member with a screw via the first fixing member, and
a screw hole for the screwing is provided in a position corresponding to the engaging portions of the divisional yoke.

5. A motor comprising:
a stator according to claim 1; and
a rotor rotated by a rotating magnetic field generated by the stator.

6. The stator according to claim 1, wherein the engaging portions of the divisional yoke are engaging recesses and the engaging portion of the tooth portion is an engaging projection.

* * * * *